United States Patent
Nord et al.

(10) Patent No.: US 9,609,592 B2
(45) Date of Patent: Mar. 28, 2017

(54) OPERATING USER EQUIPMENTS IN A WIRELESS COMMUNICATION NETWORK

(71) Applicant: Sony Corporation, Tokyo (JP)

(72) Inventors: Lars Nord, Lund (SE); Anders Berggren, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 114 days.

(21) Appl. No.: 14/285,932

(22) Filed: May 23, 2014

(65) Prior Publication Data

US 2015/0341856 A1 Nov. 26, 2015

(51) Int. Cl.
| | |
|---|---|
| H04W 52/02 | (2009.01) |
| H04W 76/02 | (2009.01) |
| H04W 4/00 | (2009.01) |
| H04W 88/04 | (2009.01) |

(52) U.S. Cl.
CPC ....... H04W 52/0212 (2013.01); H04W 4/005 (2013.01); H04W 52/0209 (2013.01); H04W 76/023 (2013.01); H04W 88/04 (2013.01)

(58) Field of Classification Search
CPC ........... H04W 52/0212; H04W 76/023; H04W 4/005; H04W 88/04; H04W 52/0209
See application file for complete search history.

(56) References Cited

U.S. PATENT DOCUMENTS

| | | | |
|---|---|---|---|
| 9,306,984 B2* | 4/2016 | Choi | H04L 65/1083 |
| 2013/0051296 A1* | 2/2013 | Park et al. | 370/311 |
| 2013/0160101 A1* | 6/2013 | Hakola | H04W 76/023 726/7 |
| 2013/0303128 A1* | 11/2013 | Wang | H04L 63/0876 455/411 |
| 2013/0339438 A1* | 12/2013 | Cherian | H04W 4/005 709/204 |
| 2014/0204847 A1* | 7/2014 | Belleschi | H04W 76/023 370/329 |

* cited by examiner

Primary Examiner — Brandon Miller
(74) Attorney, Agent, or Firm — Renner, Otto, Boisselle & Sklar, LLP

(57) ABSTRACT

A method for operating a first user equipment in a wireless communication network, a method for operating a second user equipment in a wireless communication network, a method for operating a wireless communication network, and a wireless communication system are described.

16 Claims, 2 Drawing Sheets

OPERATING USER EQUIPMENTS IN A WIRELESS COMMUNICATION NETWORK

FIELD OF THE INVENTION

The present invention relates to a method for operating a first user equipment in a wireless communication network, especially for operating the first user equipment in connection with a second user equipment in a wireless communication network. The present invention relates furthermore to a method for operating the second user equipment in a wireless communication network, a method for operating a wireless communication network, as well as to a first user equipment, a second user equipment and a server of a wireless communication network implementing the methods.

BACKGROUND OF THE INVENTION

Wireless communication networks, especially cellular wireless communication networks, are used to provide wireless communication between terminal equipments, so-called user equipments. The information communicated between the user equipments may comprise for example speech data, video data, audio data or any other kind of data up- and downloaded for example between the user equipment and the Internet. Furthermore, the user equipments may comprise for example so-called machine type communication (MTC) devices communicating wirelessly data between each other. For example, a temperature sensor may communicate via the wireless communication network a temperature information to a heating system of a building. The wireless communication network may comprise for example a communication network according to standards like UMTS (Universal Mobile Telecommunication System) or LTE (long term evolution) of the 3GPP (3rd Generation Partnership Project).

When for example a 3GPP device or user equipment is in idle mode, it needs to continuously perform a few tasks. The device or user equipment needs to listen to a broadcasting channel (PCCH) for system information, listen to a potential page on a paging channel (PCCH), and listen to a synchronization channel (SCH). Furthermore, the user equipment may also need to measure the signal strength of radio frequency signals of neighboring cells in order to perform a cell reselection. Furthermore, the user equipment may need to send location update to the wireless communication network. This may happen if the user equipment enters a new tracking area (TA) or based on timer values. The location update is needed for the wireless communication network to be able to page the user equipment for an incoming call.

For reducing power consumption, the user equipment may enter an idle mode in which the user equipment may use a maximum discontinued reception (DRX) scheme with the longest periodicity for the above-mentioned tasks. The power consumption in the idle mode may limit the maximum standby time of the user equipment which may be for example a few days or a few weeks, with usually used batteries.

Therefore, there is a need for further lowering power consumption of the user equipment for achieving longer standby times.

SUMMARY OF THE INVENTION

According to an embodiment, a method for operating a first user equipment in a wireless communication network is provided. According to the method, the first user equipment is assigned to a second user equipment, wherein the first user equipment is located within a wireless device-to-device communication range of the second user equipment. The assignment is stored in the wireless communication network. Upon assigning the first user equipment to the second user equipment, the first user equipment is set into a reduced communication operation mode. In the reduced communication operation mode, the first user equipment stops listening to a predefined set of messages which is sent from the wireless communication network. Furthermore, in the reduced communication operation mode, the first user equipment starts to listen to predefined messages which are sent from the second user equipment. The predefined set of messages from the wireless communication network may comprise for example a broadcast message, a paging message or a timing synchronization signal.

According to an embodiment, the first user equipment may stop completely receiving messages from the wireless communication network and may start to listen only to messages from the second user equipment upon assigning the first user equipment to the second user equipment. The messages from the second user equipment may comprise a so-called beacon message with which the second user equipment may forward a paging message for the first user equipment from the wireless communication network, or may communicate update channel information, for example a new cell information, for example in a payload part of the beacon. The beacons from the second user equipment may be kept in synchronization with the timing from the wireless communication network such that the first user equipment may be kept synchronized to the timing of the wireless communication network via the beacons. Therefore, the first user equipment may only need to listen to messages from the second user equipment in the reduced communication operation mode and thus, the power consumption of the first user equipment may be reduced.

According to an embodiment, for assigning the first user equipment to the second user equipment, a presence of the second user equipment within the wireless device-to-device communication range is detected at the first user equipment and a request for assigning the first user equipment to the second user equipment is transmitted from the first user equipment to the wireless communication network. As a response to the request, a confirmation from the wireless communication network is received at the first user equipment. With the confirmation the wireless communication network confirms the assignment of the first user equipment to the second user equipment. Thus, assigning the first user equipment to the second user equipment may be initiated by the first user equipment detecting the second user equipment within the wireless device-to-device communication range. Upon receiving the confirmation from the wireless communication network, the first user equipment may enter the reduced communication operation mode. Furthermore, upon confirmation, the wireless communication network may redirect messages for the first user equipment to the second user equipment which relays the messages via beacons to the first user equipment.

According to a further embodiment, assigning the first user equipment to the second user equipment comprises that the first user equipment receives an indication from the wireless communication network which indicates the assignment of the first user equipment to the second user equipment. The assignment of the first user equipment to the second user equipment is determined in the wireless communication network based on an information indicating that the first user equipment and the second user equipment are arranged within a direct wireless device-to-device communication range. For example, the wireless communication network may receive or determine the positions of the first user equipment and the second user equipment and may determine a distance between the first user equipment and the second user equipment based on the positions. In case the distance between the first user equipment and the second user equipment is short enough, it is assumed that the first user equipment and the second user equipment are arranged within the direct wireless device-to-device communication range. Additionally or as an alternative, the first and/or second user equipment may transmit an indication to the wireless communication network indicating that it has detected another user equipment within the direct wireless device-to-device communication range, e.g. based on a received radio signal strength from the other user equipment. When the wireless communication network has determined that the first user equipment and the second user equipment are arranged within the direct wireless device-to-device communication range, the wireless communication network may send the assignment indication to the first user equipment. Additionally, the wireless communication network may send a message to the second user equipment instructing the second user equipment to act as a relay for the first user equipment or to act as a relay for other user equipments in general.

According to an embodiment, the first user equipment stops sending location update information to the wireless communication network, when the first user equipment is in the reduced communication operation mode. The reduced communication operation mode is entered, when the first user equipment is arranged within the wireless device-to-device communication range of the second user equipment and is assigned to the second user equipment. The assignment is known to the wireless communication network and therefore, the wireless communication network may assume that the first user equipment is arranged near the second user equipment, and therefore no location update information needs to be send from the user equipment to the wireless communication network. This may save electrical energy at the first user equipment, as power consuming tasks comprising a position determination and sending of location update information to the wireless communication network may be avoided.

According to another embodiment, a method for operating a second user equipment in a wireless communication network is provided. A first user equipment is located within a wireless device-to-device communication range of the second user equipment. The first user equipment is assigned to the second user equipment and the assignment is stored in the wireless communication network. According to the method, a beacon message is generated in the second user equipment. The beacon message may comprise at least one message of a predefined set of messages from the wireless communication network. The beacon message is broadcasted via a transceiver unit of the second user equipment. Thus, the second user equipment may act as a relay for the first user equipment which may reduce the power consumption of the first user equipment.

According to an embodiment, an encapsulated message from the wireless communication network is received at the second user equipment. The encapsulated message comprises an identifier of the first user equipment and a message of the predefined set of messages intended for the first user equipment. The second user equipment generates a beacon message comprising the identifier of the first user equipment and the message of the predefined set of messages of the encapsulated message. The beacon message is broadcasted via the transceiver unit of the second user equipment. Thus, the wireless communication network may use the second user equipment as a relay for relaying messages directed to the first user equipment. Therefore, the first user equipment may listen to the beacon messages only, and a communication effort of the first user equipment may be reduced. This may result in a reduced power consumption of the first user equipment.

According to another embodiment, a method for operating a wireless communication network is provided. According to the method, a first user equipment, which is operated by the wireless communication network, is assigned to a second user equipment operated in the wireless communication network. The first user equipment is located within a wireless device-to-device communication range of the second user equipment. The assignment is stored in a storage unit of the wireless communication network.

According to an embodiment, the first user equipment is assigned to the second user equipment by determining, in the wireless communication network, a distance between the first user equipment and the second user equipment, and by assigning the first user equipment to the second user equipment depending on the determined distance. Furthermore, an indication indicating the assignment of the first user equipment to the second user equipment is transmitted from the wireless communication network to the first user equipment. The indication indicating the assignment of the first user equipment to the second user equipment may additionally be transmitted from the wireless communication network to the second user equipment. The distance between the first user equipment and the second user equipment may be determined by a base station or server of the wireless communication network based on location information provided from the first user equipment and the second user equipment.

According to an embodiment, assigning the first user equipment to the second user equipment may comprise that the wireless communication network receives from the first user equipment a request for assigning the first user equipment to the second user equipment. After receiving the request, the wireless communication network transmits to the first user equipment a confirmation confirming the assignment of the first user equipment to the second user equipment. The confirmation may additionally be sent to the second user equipment.

Thus, an assignment assigning the first user equipment to the second user equipment may be initiated by the wireless communication network based on position information of the first and second user equipments and/or based on a request from the first user equipment which may raise the request based on a detected device-to-device communication to the second user equipment.

According to a further embodiment, an encapsulated message for the first user equipment may be created in the wireless communication network and the encapsulated message may be sent to the second user equipment. The encapsulated message comprises an identifier of the first user equipment and the message of a predefined set of messages.

Due to the assignment of the first user equipment to the second user equipment, the second user equipment may act as a relay and may forward messages from the wireless communication to the first user equipment. In particular, the wireless communication network may transmit a message for the first user equipment to the second user equipment together with a destination address of the message, such that the second user equipment is able to forward the message to the first user equipment. As the assignment is stored in the wireless communication network, for example in a server of for example a control plane of the communication network, the second user equipment does not need to store which user equipments are assigned to the second user equipment.

In the above described embodiments, a first user equipment is assigned to a second user equipment. However, a plurality of first user equipments may be assigned to a single second user equipment and the second user equipment may act as a relay for forwarding messages from the wireless communication network to the assigned plurality of first user equipments.

According to another embodiment, a first user equipment is provided. The first user equipment comprises a transceiver unit for communicating with a wireless communication network and for communicating directly via a device-to-device communication with a second user equipment. The first user equipment comprises furthermore a processing unit which is configured to assign the first user equipment to the second user equipment, when the first user equipment is located within a wireless device-to-device communication range of the second user equipment. The assignment is additionally stored in the wireless communication network. Upon assigning the first user equipment to the second user equipment, the processing unit may set the first user equipment into a reduced communication operation mode. In the reduced communication operation mode, the processing unit may stop to listen to a predefined set of messages sent from the wireless communication network and may start to listen to a predefined message or to a predefined set of messages sent from the second user equipment. The predefined message may comprise for example a beacon message sent from the second user equipment.

The first user equipment may comprise for example a mobile phone, a personal digital assistant, a mobile music player, a mobile computer, a mobile navigation system and especially for example a machine type communication (MTC) device like a temperature sensor, a heating system, a camera system, a moving sensor, a watering sensor or a rain sensor.

According to another embodiment, a second user equipment is provided. The second user equipment comprises a transceiver unit and a processing unit. The transceiver unit is configured for communicating with a wireless communication network and for communicating directly via a device-to-device communication with the first user equipment. The first user equipment may be located within a wireless device-to-device communication range of the second user equipment and the first user equipment may be assigned to the second user equipment. The assignment is stored in the wireless communication network. The processing unit is configured to generate a beacon message comprising at least one message of a predefined set of messages from the wireless communication network, and to broadcast the beacon message via the transceiver unit.

According to an embodiment, a server of a wireless communication network is provided. The server comprises a transceiver unit for communicating with a first user equipment and a second user equipment. The first user equipment may be located within a wireless device-to-device communication range of the second user equipment. The server comprises furthermore a storage unit and a processing unit. The processing unit may be configured to assign the first user equipment to the second user equipment and to store the assignment in the storage unit. The server may comprise a server or a plurality of servers connected to the wireless communication network, and the server may comprise a server of a control plane of the wireless communication network. The storage unit may comprise a database maintaining a list of the assignments in the network.

According to another embodiment, a wireless communication system is provided which comprises the above described server comprising the storage unit, a first user equipment and a second user equipment.

Due to the assignment of the first user equipment to the second user equipment, a communication between the wireless communication system and the first user equipment may be relayed by the second user equipment. For example, a one way paging message from the network may be relayed by the second user equipment to the first user equipment. Furthermore, as another example, a system information update from the network to all user equipments may be forwarded by the second user equipment in a beacon broadcasted to all first user equipments which are assigned to the second user equipment. This may reduce communication effort of the first user equipment and may reduce the power consumption of the first user equipment. The reduced power consumption of the first user equipment may enable longer operating times of the first user equipment in case of a battery-powered user equipment. Especially in case of a machine type communication device, an operation time of the device without recharging or exchanging the battery may be prolonged from weeks to months or years.

Although specific features described in the above summary and the following detailed description are described in connection with specific embodiments, is to be understood that the features of the embodiments may be combined with each other, unless specifically noted otherwise. Furthermore, it is to be understood that the features of the above-described embodiments may be used independently from each other.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that the features of the various exemplary embodiments described herein maybe combined with each other unless specifically noted otherwise. Furthermore, any direct coupling of functional units or components in the embodiments shown in the Figures or described in the following detailed description may also be realized as an indirect coupling.

Figure 1:
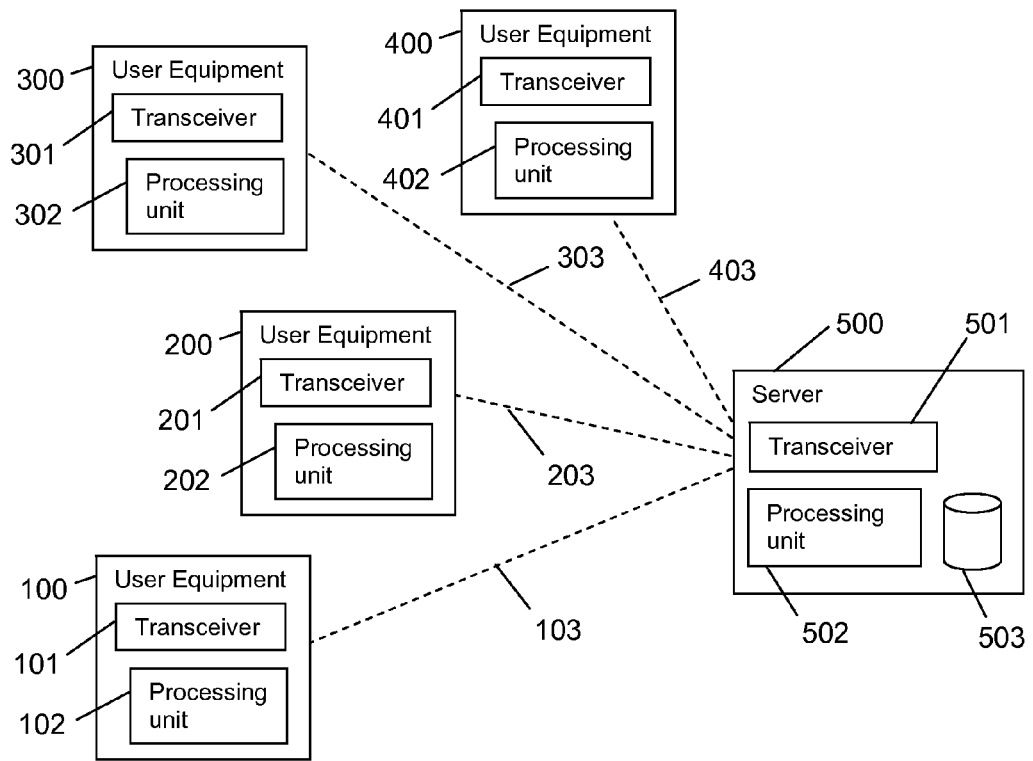
FIG. 1 shows schematically a wireless communication network in connection with a plurality of user equipments according to an embodiment of the present invention.

FIG. 1 shows schematically a wireless communication network comprising a server 500 in a wireless connection to a plurality of user equipments 100, 200, 300 and 400. In detail, a separate wireless connection 103, 203, 303 and 403 is provided to each of the user equipments 100, 200, 300 and 400. For setting up the wireless communication connections 103, 203, 303 and 403, each user equipment 100, 200, 300 and 400 is equipped with a corresponding transceiver 101, 201, 301 and 401 and the server 500 is equipped with a transceiver 501. Furthermore, each user equipment 100, 200, 300 and 400 is equipped with a corresponding processing unit 102, 202, 302 and 402. The server 500 comprises a processing unit 502 and a storage unit 503. The wireless communication network may comprise a plurality of servers 500 which may form a cellular wireless communication network according to telecommunication standards like UMTS or 3GPP LTE. The servers 500 may comprise base stations or servers providing a control plane layer of the cellular wireless communication network. In operation of the wireless communication network, the control plane layer may track in which cell each of the user equipments 100, 200, 300 and 400 is currently registered, if a cell change is needed or may be advantageously performed, or if a call or data communication is to be set up to one of the user equipments 100, 200, 300 or 400. The user equipments 100, 200, 300 or 400 may comprise for example mobile communication devices like a mobile phone, a personal digital assistant, a mobile computer, or mobile or stationary machine type communication (MTC) devices like environmental sensors, for example a temperature sensor, a moving sensor, a rain sensor, or household installation systems like a heating system or a camera monitoring system.

In a cellular wireless communication network, for example in a communication network according to 3GPP, each registered device, for example a user equipment or a machine type communication (MTC) device, may have to continuously perform a few tasks, even in idle mode. For example, the device may need to listen to a synchronization channel for synchronizing the device to timing requirements of the wireless communication network, may need to listen to a broadcasting channel for system information from the wireless communication network transmitted by the server 500, may need to listen for a potential incoming call or paging on a paging channel. Furthermore, the device also may need to measure signal strengths of neighboring cells in order to perform a cell reselection, and the device may need to send a location update to the wireless communication network. This may occur for example, if the device enters a new tracking area or based on timer values. The location update is needed for the wireless communication network to be able to page the device of an incoming call.

The power consumption in idle mode of a battery-powered device limits the maximum standby or idle time of the device. With typical battery capacities, the maximum standby or idle time of a device may be a few days or weeks. For extending the standby or idle time of a device from a few days or weeks to several months or even years, the following method 10 may be performed which will be described in more detail in connection with FIGS. 2 and 3.

The fundamental concept of the method 10 is a grouping of idle devices and to allow all but one device to enter an enhanced low power idle mode in which the devices consume very little power due to a reduced communication activity. Such an enhanced low power idle mode will be called in the following "deep idle mode".

In a first step 11 of the method 10, the devices which are arranged within a certain proximity to each other, for example within a geographical proximity or within a proximity of a direct radio frequency communication, are determined. In the following, the determination which devices are arranged within the certain proximity will also be called "grouping". For example, the user equipments 100, 200, 300 and 400 may from a group. As will become evident from the further description below, grouping is not exactly what is happening, but the devices are handle as a group in some sense when one of the devices is for example broadcasting general network information to the other devices. However, the devices are treated as individuals and may have unique identifiers (IDs). Nevertheless, it could be beneficial to also have a group ID to separate one group from another group. The grouping may be based on a device-to-device discovery based for example on a device-to-device communication. The device-to-device communication may comprise a direct radio frequency communication between the user equipments 100, 200, 300 and 400, a direct infrared communication between the user equipments, a Bluetooth communication, an RFID communication or a communication according to the device-to-device (D2D) communication defined in 3GPP. Based on the device-to-device discovery, user equipments like the user equipments 100, 200, 300 and 400, which are arranged in a geographical proximity, may form a group. One of the devices of the group may be elected as a group master and the group master may act as a relay node, as will be described below. In an exemplary embodiment, the user equipment 200 may act as the master or relay node in a group comprising the user equipments 100, 200, 300 and 400. The group is formed by assigning each of the user equipments 100, 300 and 400 to the user equipment 200. In the wording of the claims and in the wording of FIG. 3, the master or relay user equipment 200 is called "second user equipment" and the remaining user equipments 100, 300, 400 are collectively designated by the term "first user equipment". In other words, for forming the group of user equipments, the first user equipments 100, 300, 400 are assigned to the second user equipment 200. After forming the group, each first user equipment, which is assigned to the second user equipment, may communicate its assignment to the server 500 and the processing unit 502 of the server 500 may store this assignment in the storage unit 503 (step 12). Therefore, there is no purpose of the group itself, it will more be a fact that in case of more than one first user equipment is assigned to the second user equipment, it may be seen as a group.

Additionally or as an alternative, the grouping may be initiated and performed by the wireless communication network, for example by the server 500, which is in communication with the user equipments 100, 200, 300 and 400. For example, the server 500 may determine for each user equipment 100, 200, 300 and 400 a corresponding positioning information and may determine a distance between the user equipments. In case the distances between the user equipments are short enough for a direct device-to-device communication between the user equipments, the server 500 may form a group and designate one of the user equipments as the master or relay node. In the example described above, the server may designate the user equipment 200 as the master or relay node and may assign the user equipments 100, 300 and 400 to the user equipment 200. The server 500 may inform the user equipments 100, 200, 300 and 400 about the assignments and may store the assignments in the database 503.

Figure 2:
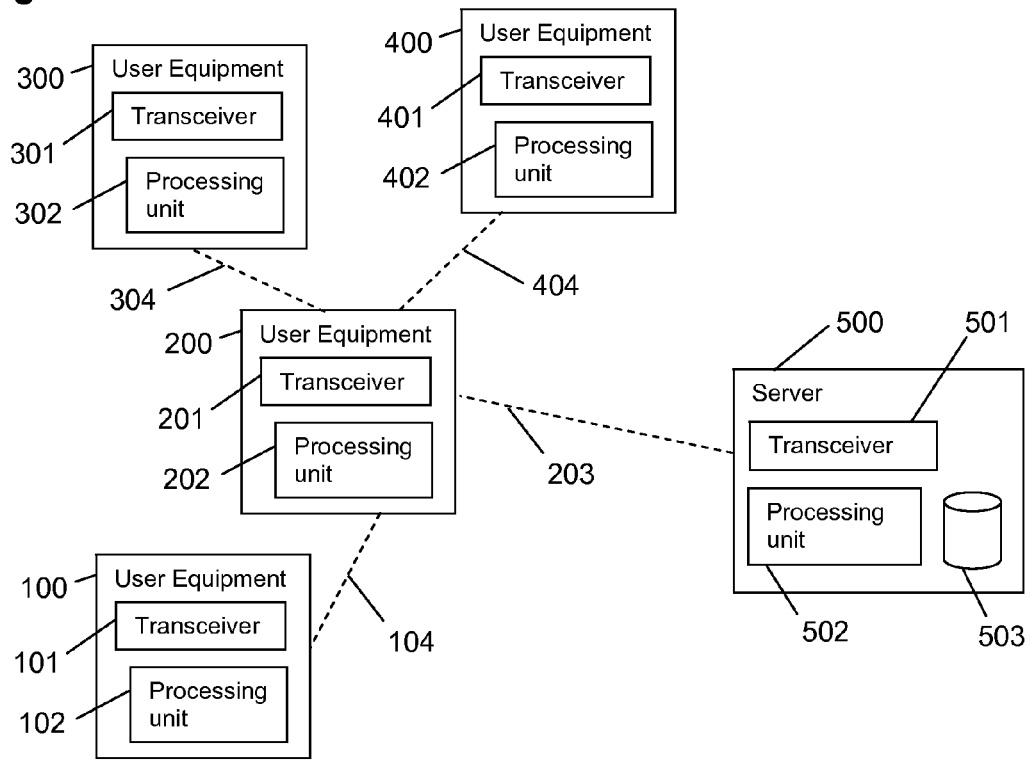
FIG. 2 shows schematically the wireless communication network of FIG. 1 with one user equipment acting as a relay node for other user equipments.
Figure 3:
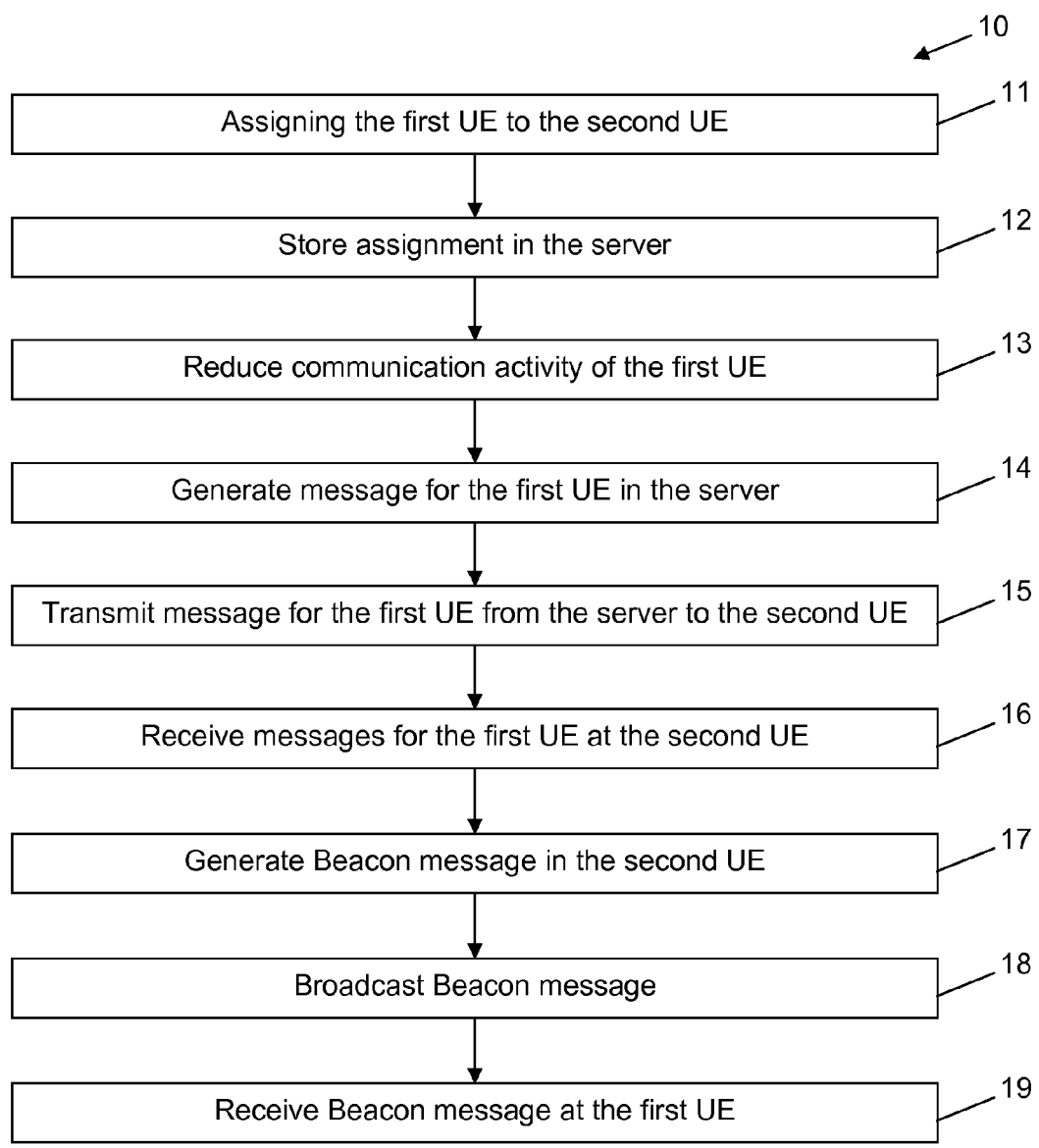
FIG. 3 shows method steps of a method according to an embodiment of the present invention.

Both methods may result in assignment data stored in a database in the wireless communication network or the server 500 providing a list of all devices that belong to different groups. After the grouping has been done, for each group there is one master or relay device which will be also called control relay node, and which is in communication contact with the wireless communication network, for example with the server 500. In other words, the list provides assignments which first user equipments are assigned to which second user equipments. In the example of FIGS. 2 and 3, the second user equipment 200 is the control relay node. Furthermore, there will be a number of other devices, for example the first user equipments 100, 300, 400, which belong to the control relay group. However, communication of the first user equipments 100, 300 and 400 will be reduced to a communication 104, 304, 404 to the second user equipment 200 as indicated in FIG. 2. Thus, in step 13, the communication activity of the first user equipments may be reduced for saving power consumption in these user equipments.

When the wireless communication network would like to page one of the user equipments 100, 300 and 400 which belongs to the control relay node 200, the wireless communication network or the server 500 may use the second user equipment 200 as a relay in communication. Therefore, in step 14, the server 500 may generate a message for one of the first user equipments, for example for user equipment 100. The message comprises an identifier of the first user equipment 100 and the actual message for the first user equipment 100. As an alternative, the message may comprise only identifying information for the first user equipment 100 to wake up the first user equipment 100 from the reduced communication activity in order to then receive information from the network. Such a combination comprising the identifier of the first user equipment 100 and the actual message for the first user equipment 100 will be called in the following "encapsulated message". The encapsulated message is sent from the server 500 via the communication connection 203 to the relay or second user equipment 200 in step 15. In step 16, the encapsulated message for the first user equipment 100 is received at the second user equipment 200, and in step 17 the second user equipment 200 generates a message for forwarding or relaying the message to the first user equipment 100. For example, the user equipment 200 may generate a so-called beacon message which may be broadcasted by the user equipment 200 in regular terms for keeping the assigned user equipments 100, 300, 400 in synchronization to a timing of the wireless communication network. For example, the beacon messages may be sent synchronously to a timing of a synchronization channel in step 18. The beacon message may comprise the identifier of the first user equipment 100 and the actual message intended for the first user equipment 100. The beacon message broadcasted in step 18 may be received by each of the first user equipments 100, 300 and 400, and therefore each of the user equipments 100, 300 and 400 may be kept in synchronization. However, as the first user equipment 100 is identified by the identifier of the beacon message as the addressee of the actual message of the beacon message, only the user equipment 100 may process the actual message part of the beacon message. Therefore, in step 19, the beacon message is received at and processed by the first user equipment 100. In case of several first user equipments all first user equipments process the beacon message, but only the user equipment for which the message was intended will continue acting on the message. All other first user equipments assigned to the second user equipment which transmitted the beacon will discard the beacon and return to deep idle mode. For example, in case the beacon message comprises a paging message for the first user equipment 100, the first user equipment 100 may either enter a normal idle mode with a direct communication 103 to the server 500 and may listen for a repeated paging message, or the first user equipment 100 may initiate to establish a connection to the wireless communication network. The other first user equipments 300, 400 which received the broadcasted beacon message may return to deep idle mode.

To sum up, once the group has been created, the control relay 200 may continue to perform usual idle mode tasks and may start to transmit the control beacons. The control beacons may be short with a low duty cycle, such that the additional power consumption that this beacon transmission adds, is marginal and manageable to handle for the control relay user equipment. All other user equipments in the group stop their normal idle mode activities and start to only listen to the control beacons. These user equipments may save idle mode parameters like timing, cell ID, cell information and so on to be used later, when the user equipments reenter the network in a normal operation mode.

When the control relay 200 changes a cell of the cellular wireless communication network, receives updated channel information, or moves into a new tracking area of the wireless communication network, it may perform the usual tasks to the network. However, as the other user equipments 100, 300 and 400 of the group have stopped listening to communication from the wireless communication network, the server 500 may automatically update in the data base 503 a location of all user equipments 100, 300 and 400 that belong to the control relay group when the control relay 200 sends a location update to the server 500. Therefore, one user equipment, for example the relay user equipment 200, may update a network status of several other user equipment, for example the user equipments 100, 300 and 400, and may thus reduce the control plane traffic in the wireless communication network. Furthermore, the relay node 200 may add the changed idle mode parameters to the beacon as a payload, for example sending only a delta information to all assigned user equipments in the deep idle mode. This information may be useful once the user equipment 100, 300 or 400 moves away from the relay user equipment 200 and needs to start monitoring the wireless communication network in normal idle mode.

Examples of information added to the beacon may comprise for example a new cell ID with its specific timing and/or channel information, new neighbors to monitor, or an incoming page to a specific user equipment in the deep idle mode. To maintain network synchronization, the control beacons may be linked or synchronized to the synchronization channel (SCH) of the wireless communication network. This may allow that clocks of user equipments in deep idle mode maintain global network synchronization even though they do not directly listen to the synchronization channel.

As described above, the group information may be kept in the database 503 of the server or in any other database of the wireless communication network. Therefore, the control relay 200 does not need to know which user equipments belong to its group. A user equipment may be added or removed without informing the control relay 200. There is only a need for one-way transmission of beacons from the control relay 200. Therefore, the number of user equipments 100, 300, 400 belonging to a group is basically unlimited.

The control plain relay functionality may reside in any user equipment, in other words, any user equipment may act as a control plane relay.

The above described method may be used for grouping several LTE-based low-cost machine type communication (MTC) devices. This may allow the devices to be reachable always by the network and at the same time may have a standby time of several years with a normal battery. Furthermore, the above described method may be used for a group of user equipments travelling along a same route. For example, when a night train is travelling from one city to another city, most mobile telephones may enter a deep idle mode and only a few or in an extreme only one mobile telephone may act as a relay node and may send location updates to the network throughout the journey, thus saving the network of receiving the same location update messages from hundreds of mobile telephones.

Finally, it is to be understood that all the embodiments described above are considered to be comprised by the present invention as it is defined by the appended claims.

What is claimed is:

1. A method for operating a first user equipment in a wireless communication network, the method comprising:
    assigning the first user equipment to a second user equipment, wherein the first user equipment is located within a wireless device-to-device communication range of the second user equipment, wherein the assignment is stored in the wireless communication network, and
    upon assigning the first user equipment to the second user equipment, setting the first user equipment into a reduced communication operation mode, wherein in the reduced communication operation mode the first user equipment stops listening to a predefined set of messages sent from the wireless communication network and starts listening to a predefined message sent from the second user equipment.

2. The method according to claim 1, wherein assigning the first user equipment to the second user equipment comprises:
    detecting, at the first user equipment, a presence of the second user equipment within the wireless device-to-device communication range,
    transmitting from the first user equipment to the wireless communication network a request for assigning the first user equipment to the second user equipment, and
    receiving at the first user equipment a confirmation from the wireless communication network confirming the assignment of the first user equipment to the second user equipment.

3. The method according to claim 1, wherein assigning the first user equipment to the second user equipment comprises:
    receiving at the first user equipment an indication from the wireless communication network indicating the assignment of the first user equipment to the second user equipment, wherein the assignment of the first user equipment to the second user equipment is determined in the wireless communication network based on an information indicating that the first user equipment and the second user equipment are arranged within a direct wireless device-to-device communication range.

4. The method according to claim 1, wherein in the reduced communication operation mode the first user equipment stops sending location update information to the wireless communication network.

5. The method according to claim 1, wherein the predefined set of messages comprises at least one of a group comprising:
    a broadcast message from the wireless communication network,
    a paging message from the wireless communication network, and
    a timing synchronization signal from the wireless communication network.

6. A method for operating a second user equipment in a wireless communication network, wherein a first user equipment is located within a wireless device-to-device communication range of the second user equipment, wherein the first user equipment is assigned to the second user equipment and the assignment is stored in the wireless communication network and communicated by the wireless communication network to the second user equipment, wherein upon assigning the first user equipment to the second user equipment, the first user equipment is set into a reduced communication operation mode, wherein in the reduced communication operation mode the first user equipment stops listening to a predefined set of messages sent from the wireless communication network and starts listening to a predefined message sent from the second user equipment, the method comprising:
    generating a beacon message in the second user equipment, the beacon message comprising at least one message of a predefined set of messages from the wireless communication network, and
    broadcasting the beacon message via a transceiver unit of the second user equipment.

7. The method according to claim 6, further comprising:
    receiving, at the second user equipment, an encapsulated message from the wireless communication network, the encapsulated message comprising an identifier of the first user equipment and a message of the predefined set of messages,
    generating a beacon message in the second user equipment, the beacon message comprising the identifier of the first user equipment and the message of the predefined set of messages of the encapsulated message, and
    broadcasting the beacon message via the transceiver unit of the second user equipment.

8. A method for operating a wireless communication network, the method comprising:
    assigning a first user equipment operated in the wireless communication network to a second user equipment operated in the wireless communication network, wherein the first user equipment is located within a wireless device-to-device communication range of the second user equipment, and upon assigning the first user equipment to the second user equipment, setting the first user equipment into a reduced communication operation mode, wherein in the reduced communication operation mode the first user equipment stops listening to a predefined set of messages sent from the wireless communication network and starts listening to a predefined message sent from the second user equipment,
    storing the assignment in a storage unit of the wireless communication network, and
    communicating, by the wireless communication network to the second user equipment, the stored assignment.

9. The method according to claim 8, wherein assigning the first user equipment to the second user equipment comprises:
    determining, in the wireless communication network, a distance between the first user equipment and the second user equipment,
    assigning the first user equipment to the second user equipment depending on the determined distance, and
    transmitting from the wireless communication network to the first user equipment an indication indicating the assignment of the first user equipment to the second user equipment.

10. The method according to claim 8, wherein assigning the first user equipment to the second user equipment comprises:
receiving at the wireless communication network from the first user equipment a request for assigning the first user equipment to the second user equipment, and
transmitting from the wireless communication network to the first user equipment a confirmation confirming the assignment of the first user equipment to the second user equipment.

11. The method according to claim 8, further comprising:
creating in the wireless communication network an encapsulated message for the first user equipment, the encapsulated message comprising an identifier of the first user equipment and a message of a predefined set of messages, and
sending the encapsulated message to the second user equipment.

12. A first user equipment, comprising:
a transceiver unit for communicating with a wireless communication network and for communicating directly via a device-to-device communication with a second user equipment, and
a processing unit, configured to assign the first user equipment to the second user equipment, when the first user equipment is located within a wireless device-to-device communication range of the second user equipment, wherein the assignment is stored in the wireless communication network, and to set the first user equipment into a reduced communication operation mode upon assigning the first user equipment to the second user equipment, wherein, in the reduced communication operation mode, the processing unit stops listening to a predefined set of messages sent from the wireless communication network and starts listening to a predefined message sent from the second user equipment.

13. The first user equipment according to claim 12, wherein the first user equipment comprises at least one device of a group comprising a mobile phone, a personal digital assistant, a mobile music player, a mobile computer, a mobile navigation system, a temperature sensor, a heating system, a camera system, a moving sensor, a watering sensor, and a rain sensor.

14. A second user equipment, comprising:
a transceiver unit for communicating with a wireless communication network and for communicating directly via a device-to-device communication with a first user equipment, wherein the first user equipment is located within a wireless device-to-device communication range of the second user equipment, wherein the first user equipment is assigned to the second user equipment and the assignment is stored in the wireless communication network and communicated by the wireless communication network to the second user equipment, wherein upon the first user equipment being assigned to the second user equipment the first user equipment is set into a reduced communication operation mode, wherein in the reduced communication operation mode the first user equipment stops listening to a predefined set of messages sent from the wireless communication network and starts listening to a predefined message sent from the second user equipment, and
a processing unit, configured to generate a beacon message, the beacon message comprising at least one message of a predefined set of messages from the wireless communication network, and to broadcasting the beacon message via the transceiver unit.

15. A server of a wireless communication network, the server comprising:
a transceiver unit for communicating with a first user equipment and a second user equipment, wherein the first user equipment is located within a wireless device-to-device communication range of the second user equipment,
a storage unit, and
a processing unit configured to assign the first user equipment to the second user equipment, and to store the assignment in the storage unit, wherein upon the first user equipment being assigned to the second user equipment, the first user equipment is set into a reduced communication operation mode, wherein in the reduced communication operation mode the first user equipment stops listening to a predefined set of messages sent from the wireless communication network and starts listening to a predefined message sent from the second user equipment.

16. A wireless communication system comprising:
a server according to claim 15;
a first user equipment and;
a second user equipment
wherein the first user equipment includes
a first transceiver unit for communicating with a wireless communication network and for communicating directly via a device-to-device communication with the second user equipment, and
a first processing unit, configured to assign the first user equipment to the second user equipment, when the first user equipment is located within a wireless device-to-device communication range of the second user equipment, wherein the assignment is stored in the wireless communication network, and to set the first user equipment into a reduced communication operation mode upon assigning the first user equipment to the second user equipment, and
wherein the second user equipment comprises
a second transceiver unit for communicating with the wireless communication network and for communicating directly via a device-to-device communication with the first user equipment, wherein the first user equipment is located within a wireless device-to-device communication range of the second user equipment, wherein the first user equipment is assigned to the second user equipment and the assignment is stored in the wireless communication network, and
a second processing unit, configured to generate a beacon message, the beacon message comprising at least one message of a predefined set of messages from the wireless communication network, and to broadcasting the beacon message via the transceiver unit.

* * * * *